March 25, 1947. W. W. STOUT 2,417,891
ANIMAL TRAP
Filed Aug. 1, 1945
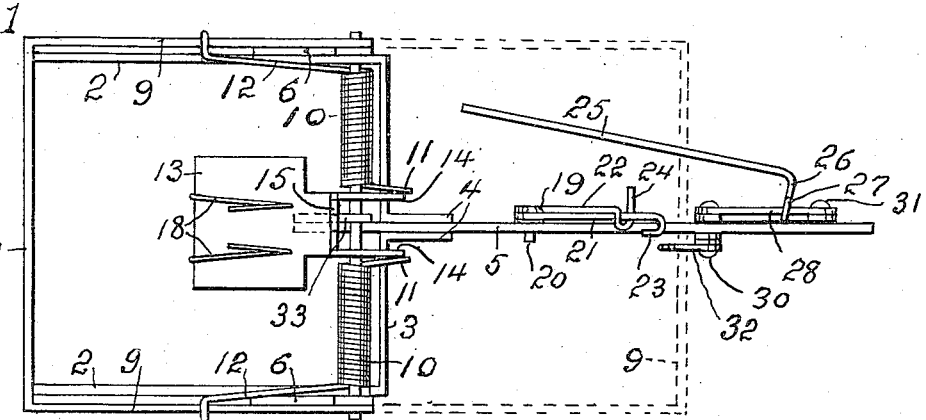
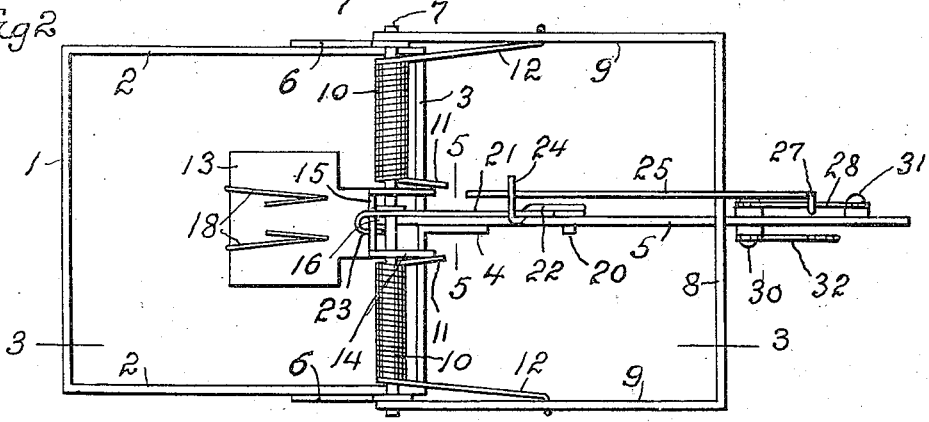
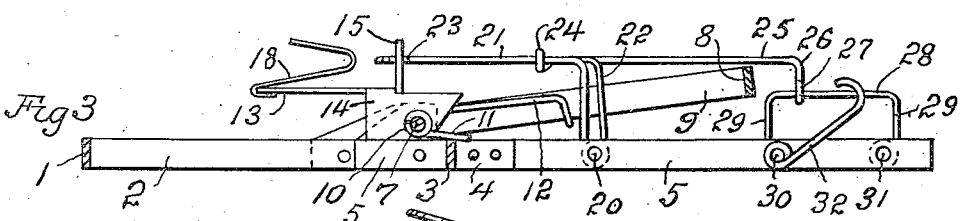
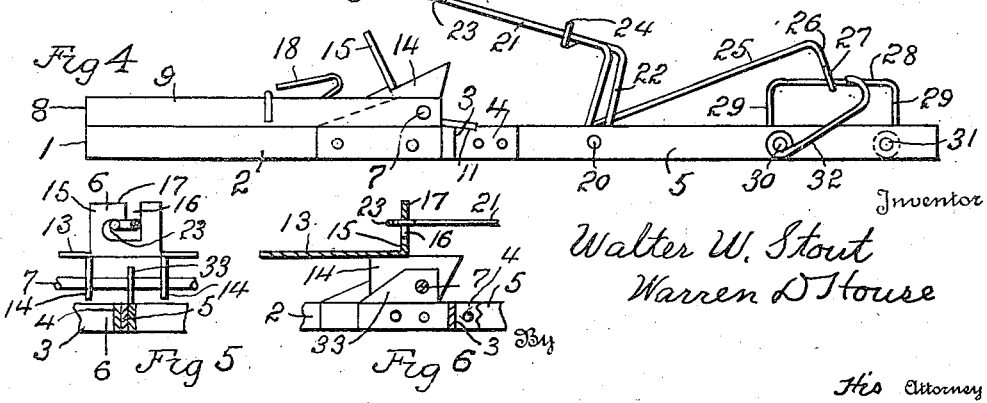
Inventor
Walter W. Stout
Warren D House
His Attorney Patented Mar. 25, 1947

2,417,891

UNITED STATES PATENT OFFICE 2,417,891

ANIMAL TRAP

Walter W. Stout, Turney, Mo.

Application August 1, 1945, Serial No. 608,183

6 Claims. (Cl. 43—81.5)

My invention relates to improvements in animal traps of the type comprising two cooperating clamping jaws, one stationary and the other pivoted thereto to swing from a set position to a clamping position, resilient means for normally swinging the pivoted jaw from the set to the clamping position, trigger operated means for releasably holding the pivoted jaw in the set position, and a bait supporting means for releasably holding the trigger operated means in the jaw holding position.

One of the objects of my invention is the provision in an animal trap of the kind described of novel animal releasable bait supporting means and trigger operated means by which the trigger operated means can be released by movement of the bait operating means in either of two opposite directions.

A further object of my invention is the provision in an animal trap of the kind described, of novel trigger operated means by which the degree of force required to operate the bait supporting means for releasing the trigger operated means may be varied.

Another object of my invention is the provision in a trap of the kind described of novel manually operated means for safety locking the swinging jaw in the set position.

Still another object of my invention is the provision of a trap of the kind described, which is simple, cheap to make, strong, durable, not likely to get out of order, which can be easily and quickly adjusted to its operated position, and which is efficient in its operation.

The novel features of my invention are hereinafter fully described and claimed.

In the accompanying drawings, which illustrate the preferred embodiment of my invention—

Fig. 1 is a plan view of my improved trap, the swinging jaw being shown in solid lines in the closed clamping position, and shown in dotted lines in the set position, the locking hook being shown in solid lines in its locking position.

Fig. 2 is a plan view of the trap showing the swinging jaw held in the set position by the trigger mechanism and bait supporting means, the locking hook being shown in a released position.

Fig. 3 is a vertical sectional view on the line 3—3 of Fig. 2, the trigger operating lever, however, being shown more forwardly advanced than in Fig. 2, the locking hook being shown in a released position.

Fig. 4 is a side elevation of the trap, showing the swinging jaw in the closed clamping position and the bait support, trigger, trigger operating lever and locking hook in released positions.

Fig. 5 is a vertical sectional view on the line 5—5 of Fig. 2, with some parts omitted.

Fig. 6 is a sectional view on the line 6—6 of Fig. 5, some parts omitted.

Similar characters of reference designate similar parts in the different views.

My improved trap is provided with a base frame comprising a front portion consisting of a flat bar disposed edge up and formed into a rectangle having a front wall 1, two rearwardly extending side walls 2 and a rear wall 3, the end portions 4 of the bar are extended at right angles rearwardly from the rear wall 3, and between them is fastened a middle edge up rearwardly extending bar 5, forming the rear portion of the base frame.

Forming parts of the base frame are two vertical flat plates 6 which are rigidly fastened to the outer sides respectively of the side walls 2, adjacent to the rear wall 3 and extending above the side walls 2. A horizontal transverse pivot bar 7 has its ends respectively mounted in the plates 6 above and spaced from the side walls 2, and adjacent to the rear wall 3.

The walls 1, 2, and 3 and the plates 6 form the lower stationary jaw of the trap.

An edge up bar bent into U shape to form a front wall 8 and two side walls 9, the latter being pivoted on the pivot bar 7, provides the upper swinging jaw of the trap. In the closed or clamping position, of the swinging jaw, the front wall 8 thereof rests with its lower edge against and parallel with the upper edge of the front wall 1 of the lower jaw, as shown in Figs. 1 and 4. The swinging jaw 8—9 can be manually swung from the closed clamping position, shown in Figs. 1 and 4 to the set position shown in dotted lines in Fig. 1 and in solid lines in Figs. 2 and 3.

For normally swinging the upper jaw 8—9 forcibly from the set position to the closed clamping position against the front wall 1 of the lower jaw, two coiled springs 10 encircle the pivot bar 7 between the side walls 2 of the lower jaw. Their inner end portions 11 are spaced apart and extend rearwardly over and against the upper edge of the rear wall 3 of the lower jaw, Fig. 1. The other end portions 12 of the springs have their free ends bent into U form and respectively embrace the side walls 9 and the upper edges thereof, when the upper jaw is in the closed position, shown in Figs. 1 and 4.

When the upper jaw is swung to the set position, Figs. 2 and 3, the tension of the springs 10 is greatly increased.

Animal releasable bait supporting means are provided consisting of a sheet metal bait pan 13 having two parallel vertical longitudinal flanges 14 pivoted on the pivot bar 7 between the spring coils 10. Between the flanges 14, the bait pan has an upwardly extending transverse wall 15 having in its upper edge a vertical slot 16, which at its lower end extends laterally forming at one side of the slot a lip 17 at the upper end of the wall 15.

For fastening bait to the bait pan 13, there are fastened to its front edge two upwardly and rearwardly extending wire hooks 18.

For releasably holding the upper jaw 8—9 in the set position, shown in Figs. 2 and 3, a trigger mechanism, controlled by the bait pan 13 is provided and consists of the following described parts.

A wire is formed into a ring 19 which is pivotally mounted on a horizontal transverse pin 20 mounted in the bar 5 at the rear of the rear wall 3 of the lower jaw. From the ring 19 the wire extends in two arms 21 and 22 upwardly for a distance and then at an angle forwardly. The longer arm 21 has at its free end a hook 23, adapted, when the trigger is in the set position, shown in Figs. 2, 3, 5 and 6 to be disposed horizontally in the slot 16 with the hook 23 disposed under the lip 17 of the bait pan.

The other arm 22 of the trigger is formed around and across the arm 21 between the hook 23 and the upwardly extending portion of the trigger, to form a horizontal transverse finger 24.

For releasably holding the trigger in the set position, shown in Figs. 2 and 3, a wire operating lever is provided having a longitudinal straight portion 25, at the rear end of which is an angular portion 26 having an eye 27 which is pivotally and longitudinally slidably mounted on the longitudinal horizontal portion 28 of an inverted U shaped wire guide member the arms 29 of which extend upwardly respectively from two pins 30 and 31 mounted in the bar 5 at the rear of the pin 20.

In setting the trap, the bait is applied to the bait pan hooks 18, after which the upper jaw 8—9 is manually swung to the set position, shown in dotted lines in Fig. 1 and in solid lines in Figs. 2 and 3. For safety purposes, the locking hook 32 is provided, pivoted on the pin 30, and which can be swung to the locking position, shown in Fig. 1, in which it will hold the upper jaw 8—9 from swing from its set position.

The trigger is then swung to its operative position with its hook 23 engaging the under edge of the lip 17 of the bait pan.

The operating lever 25 is then inserted under and against the transverse finger 24 of the trigger, and the portion 8 of the upper jaw is permitted to press upwardly against the under side of the operating lever 25, the safety locking hook 32 being swung in the meantime to the released position, shown in Fig. 3.

The upward pressure of the upper jaw 8—9 against the lever 25, together with the upward pressure of the lever on the trigger finger 24 and the hook 23 pressing upwardly on the lip 17 of the bait pan, will hold the bait pan in the set position.

By different positioning of the eye 27 of the operating lever on the guide member 28, forwardly or backwardly, the ease by which an animal can release the bait pan from holding engagement with the hook 23, can be varied. The further forwardly the eye 27 is set on the guide 28, the easier the bait pan can be swung to a released position, and vise versa.

If, in trying to get the bait from the bait pan, the animal swings the front end of the bait pan downwardly, the wall 15 of the pan will swing forwardly so as to release the hook 23 of the trigger. If the animal swings the front end of the bait pan upwardly, the wall 15 will swing rearwardly so as to pass the end of the hook 23, upon which the trigger will be released. So in either direction in which the animal swings the bait pan, the trigger hook will be released, and so will the jaw 8—9.

The springs 10 will then swing the upper jaw 8—9 toward the closed clamping position, shown in solid lines in Fig. 1 and in Fig. 4, and gripping the animal between the upper and lower jaws of the trap.

For centrally bracing the pivot bar 7, it is pivoted in a vertical plate 33 fastened to one side of the bar 5 forward of the wall 3 and between the flanges 14 of the bait pan, Figs. 1, 3 and 6.

Various modifications of my invention may be made, within the scope of the appended claims without departing from the spirit of my invention.

What I claim is:

1. In an animal trap of the kind described, in combination with a base member having a horizontal front portion forming a lower jaw, an upper jaw, means pivoting said upper jaw on a transverse horizontal axis to said base member above and adjacent to the rear end of said lower jaw, so that said upper jaw may be swung from a front closed position against said lower jaw to an open set position at the rear of said lower jaw, means connecting said jaws normally exerting a pressure tending to swing said upper jaw from its set to its closed position, a bait support pivoted to said base member, and means for releasably holding said upper jaw in its set position, of a trigger pivoted to said base member and having means for releasably holding said bait support in a set position and having means for releasably holding said jaw holding means in the set position, said bait support in its set position holding said trigger in the set position and being releasable therefrom when swung a predetermined distance in either of two opposite directions.

2. In an animal trap of the kind described, in combination with a base member having a horizontal front portion forming a lower jaw, an upper jaw, means pivoting said upper jaw on a transverse horizontal axis to said base member above and adjacent to the rear end of said lower jaw, so that said upper jaw may be swung from a front closed position against the lower jaw to an open set position at the rear of said lower jaw, means connecting said jaws normally exerting a pressure tending to swing said upper jaw from its set to its closed position, and a bait support pivoted to said base member, of a lever pivoted to said base member and movable to a position in which it will engage and hold said upper jaw in its set position, and a trigger pivoted to said base member and having means for being swung to a set position in which it will hold said lever in its set position, and having means for engaging and holding said bait support in a set position and for being held thereby in its set position.

3. In an animal trap of the kind described, in combination with a base member having a horizontal front portion forming a lower jaw, an upper jaw, means pivoting said upper jaw on a transverse horizontal axis to said base member above and adjacent to the rear end of said lower jaw, so that said upper jaw may be swung from a front closed position against said lower jaw to an open set position at the rear of said lower jaw, means connecting said jaws normally exerting a pressure tending to swing said upper jaw from its set to its closed position, and a bait support pivoted to said base member, of a lever pivoted to said base member and longitudinally slidable thereon to a position in which it will engage and hold said upper jaw in its open set position, and a trigger pivoted to said base member and having means for being swung to a set position in which it will hold said lever in its adjusted position, and having means for engaging and holding said bait support in a set position and for being held thereby in its set position.

4. In an animal trap of the kind described, in combination with a base member having a horizontal front portion forming a lower jaw, an upper jaw, means pivoting said upper jaw on a transverse horizontal axis to said base member above and adjacent to the rear end of said lower jaw, so that said upper jaw may be swung from a front closed position against said lower jaw to an open set position at the rear of said lower jaw, means connecting said jaws normally exerting a pressure tending to swing said upper jaw from its set position to its closed position, and a bait support pivoted to said base member, of a guide member mounted on said base member, at the rear of said upper jaw when in its set position, a lever pivoted to and longitudinally slidable on said guide member to a position in which it will extend over and engage and hold said upper jaw in the set position, and a trigger pivoted to said base member so as to be swung to a set position in which it will engage and hold said bait support in its set position and having a transverse finger for engaging the upper side of said lever to hold the latter in its jaw holding position.

5. In an animal trap, in combination with a base member having a front horizontal portion forming a lower jaw, an upper jaw, means pivoting said upper jaw on a transverse horizontal axis to said base member above and adjacent to the rear end of said lower jaw, so that said upper jaw may be swung from a front closed position against said lower jaw to an open set position at the rear of said lower jaw, means connecting said jaws normally exerting a pressure tending to swing said upper jaw from its set to its closed position, of a bait support pivoted to said base member on a transverse horizontal axis and having an upwardly extending transverse wall having in its upper edge a slot having a lateral extension forming a lip in the upper edge of said wall next said slot, a trigger pivoted to said base member and having at its front end a hook adapted to be inserted into said slot with its free end engaging the under edge of said lip for releasably holding said bait support set, and means for holding said upper jaw set and said hook in releasable holding engagement with said bait support.

6. In an animal trap, in combination with a base member having a horizontal front portion forming a lower jaw, an upper jaw, means pivoting said upper jaw on a transverse horizontal axis to said base member above and adjacent to the rear end of said lower jaw, so that said upper jaw may be swung from a front closed position against said lower jaw to an open set position at the rear of said lower jaw, means connecting said jaws normally exerting a pressure tending to swing said upper jaw from its set to its closed position, of a bait support pivoted to said base member on a transverse horizontal axis and having an upwardly extending transverse wall having in its upper edge a slot having a lateral extension forming a lip in the upper edge of said wall next said slot, a trigger pivoted to said base member and having at its front end a hook adapted to be inserted into said slot with its free end engaging the under edge of said lip for releasably holding said bait support set, said trigger having a transverse finger, a longitudinal guiding means on said base member at the rear of said upper jaw when the latter is in its set position, and a lever pivoted to and longitudinally slidable on said guiding means to a position extending forwardly over said upper jaw, when said upper jaw is in the set position, for releasably holding said upper jaw set, said lever being adapted to be moved to a position in which it will engage the under side of said trigger finger, and be held thereby in holding engagement with said upper jaw, and holding said trigger hook in releasable holding engagement with said lip of said bait support wall.

WALTER W. STOUT.

REFERENCES CITED

The following references are of record in the file of this patent:

UNITED STATES PATENTS

| Number | Name | Date |
| --- | --- | --- |
| 1,015,916 | Teel | Jan. 30, 1912 |
| 1,665,951 | Ebel | Apr. 10, 1928 |